June 9, 1942.                    W. E. O'SHEI                    2,286,004
                              WINDSHIELD CLEANER
                         Filed May 20, 1939           2 Sheets-Sheet 1
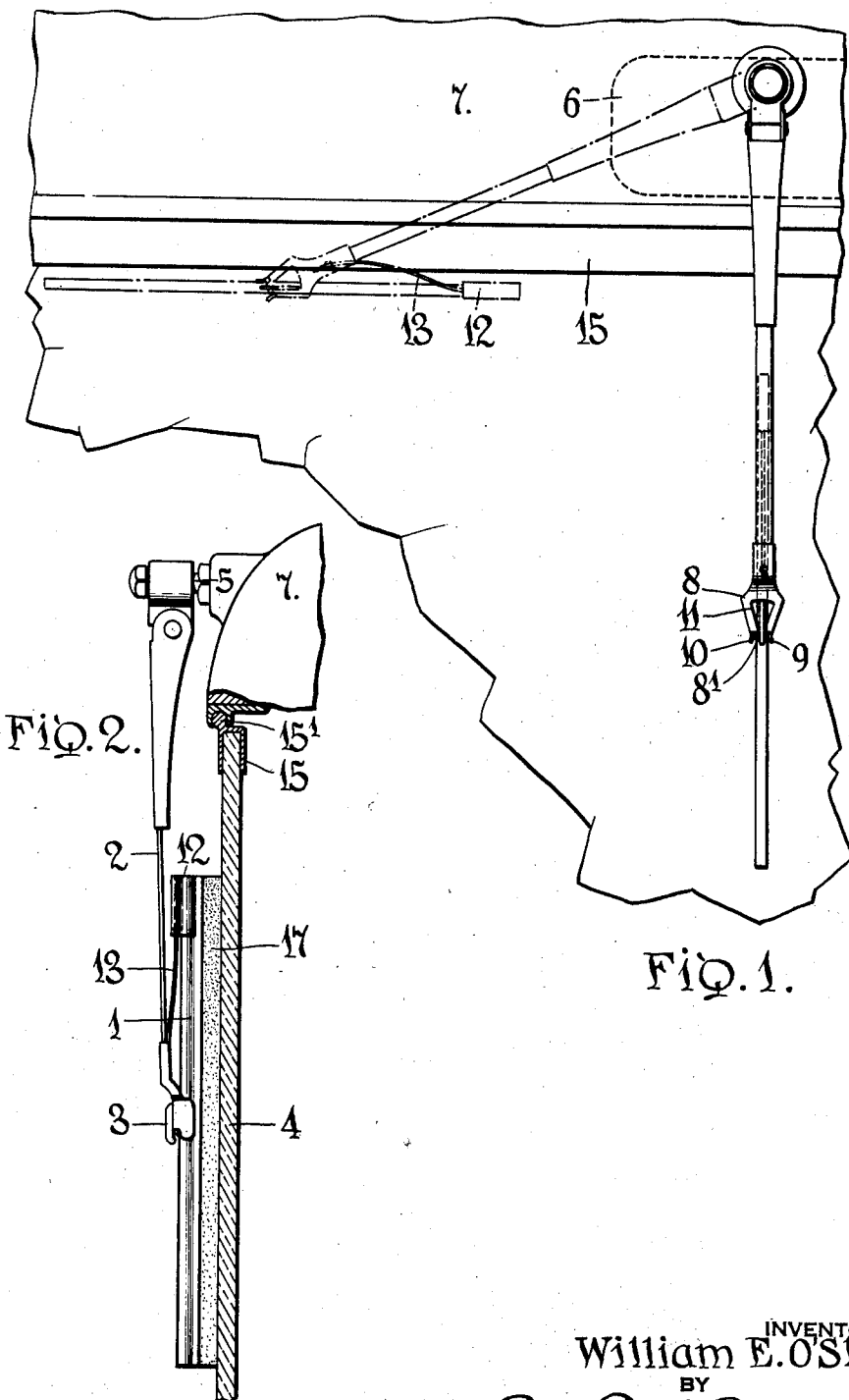
INVENTOR
William E. O'Shei,
BY
Beau, Brooks, Buckley & Beau.
ATTORNEYS

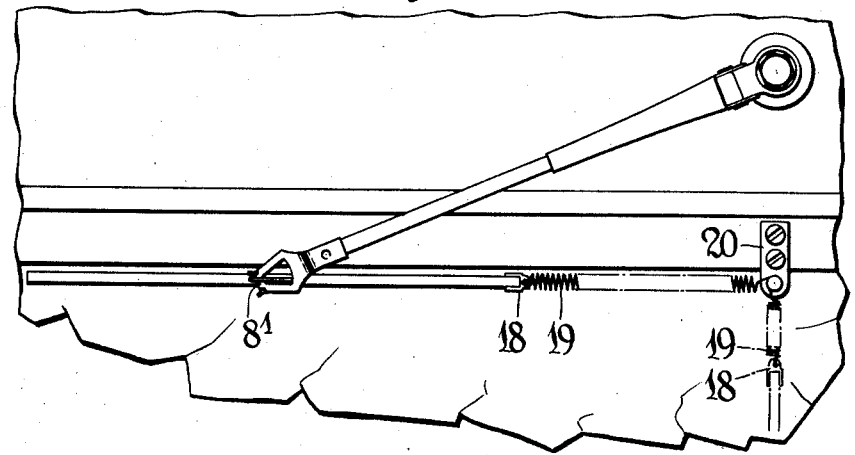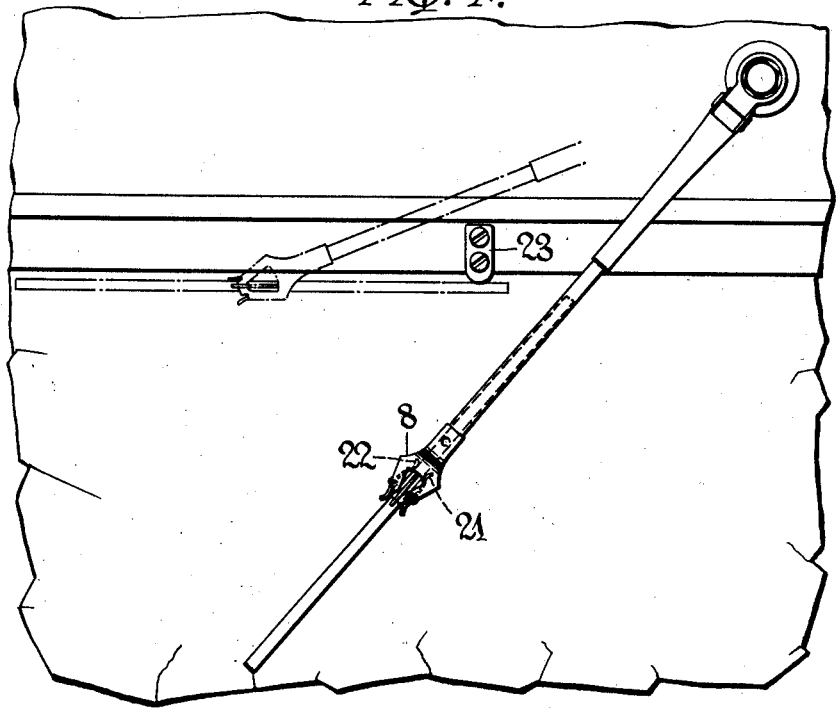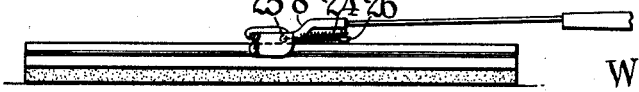

Patented June 9, 1942

2,286,004

UNITED STATES PATENT OFFICE 2,286,004

WINDSHIELD CLEANER

William E. O'Shei, London, England

Application May 20, 1939, Serial No. 274,761
In Great Britain May 30, 1938

9 Claims. (Cl. 15—255)

The present invention relates to windshield wipers and more particularly to a wiper blade and a wiper arm arrangement whereby the angle or arc of wiping may be increased without increasing the actual angle through which the wiper arm is moved.

According to one aspect, the present invention consists in a windshield wiper, the wiper blade of which is angularly movable with respect to the wiper arm, the arrangement being such that between its two extreme wiping positions, the wiper blade sweeps through a substantially greater angle than is swept through by the wiper arm.

The wiper blade is mounted so as to be angularly movable with respect to the wiper carrying member, and means are provided for resiliently holding the wiper blade beneath its carrying member while permitting turning relative to the said member during the movement of the latter.

The invention also consists in a wiper blade for use in the windshield wiper arranged as previously described, wherein the blade, in addition to the provision of means for attaching it to the wiper arm, is provided with a guiding channel, guiding loops or the like through which a guiding rod can slidably pass.

The invention further consists in a wiper blade, which in addition to the provision of means for attaching it to the wiper arm, is provided adjacent one end with an extensible guiding means, which is extensible substantially in the longitudinal direction of the blade.

The invention further consists in a wiper blade, which in addition to the provision of means for attaching it to the wiper arm, is provided with a spring connected thereto adjacent one end, the other end of the spring being provided with means for the purpose of attaching it to a member spaced from the pivot about which the wiper arm rotates.

Various embodiments according to the invention are illustrated, by way of example, in the accompanying drawings, in which—

Fig. 1 shows a preferred constructional form of the improved windshield wiper in front elevation;

Fig. 2 is a sectional elevation of this arrangement;

Fig. 3 shows in front elevation an alternative arrangement;

Fig. 4 shows in front elevation another alternative arrangement; and

Fig. 5 shows in side elevation a further alternative arrangement.

Referring to the arrangement shown in Figs. 1 and 2, a wiper blade of a well-known type comprising a flexible squeegee portion 17 secured in a holder or backing 1, is detachably secured to a wiper arm 2 by a hook-shaped fin member 3 provided on the holder or backing 1 in the known manner. The wiper arm 2, as is usual, is biased toward the windshield 4 and is carried on a shaft 5 of a suction or electric driving motor 6, which is mounted at the rear of the header bar 7 or other fixed part of a motor vehicle frame with the shaft 5 extending therethrough.

The free end of the wiper arm 2 is provided with a channel-shaped wiper blade supporting bracket 8 having a small bridge piece 8' formed at the apex of a triangular plate portion over which the hook portion of the fin 3 engages. The bridge piece 8, which is supported at the ends of two flanges 9 and 10 projecting inwardly from the plate portion and converging towards the outer end of the arm, is inclined to the main portion of the bracket and the hook on the fin 3 is shaped so that the blade may be engaged with or disengaged from the arm only when the blade is inclined with respect to the plate portions of the bracket, that is, when the wiper is in its operating position, the blade may only be removed from its arm by swinging the arm away from the windshield.

The triangular outer plate portion of the bracket between the flanges 9 and 10 is formed with a V-shaped or sector shaped slot 11 in which the hooked fin 3 is accommodated so as to be rotatable about the apex of the slot between the limits of the converging sides thereof. The wiper blade is thus permitted a limited amount of rotation on either side of the wiper arm 2 about an axis passing through the apex of the slot 11, and perpendicular to the triangular outer portion of the bracket.

Owing to the loose nature of the connection between the hooked fin 3 and the bridge 8, a limited amount of rocking of the wiper blade is also permitted about its longitudinal axis passing through the bridge. This rocking which permits the wiping surface of the squeegee 17 to be inclined to the surface of the windshield 4, is limited by the flanges 9 and 10 on either side of the slot 3.

The outer ends of the flanges 9 and 10 are flared outwardly slightly so as alternately to engage the sides of the wiper arm in its extreme positions of rotation relative to the wiper arm 2 with a smooth surface.

At its end nearest to the pivot of the wiper arm 2, the wiper blade is provided on its holder or backing 1 with a channel-shaped member 12 spaced so as to form a tunnel or guideway with the backing. A spring guide rod 13 is fixed at one end to the bracket 8 and has its free end slidably engaged in the guideway 12 so as to normally urge the wiper beneath the arm in the plane thereof and yet permit it to turn relative to the arm, the spring rod yielding laterally, as shown in Fig. 1. This enables the wiper to adjust itself squarely against the molding or frame 15 of the windshield.

As will be seen from Fig. 1, when the wiper arm 2 is away from the windshield frame, the wiper blade 1 is in alignment therewith, and as the wiper arm 2 is moved to one extreme position as shown in dotted lines, the blade 1 is rotated so that in the extreme position it lies substantially parallel to the horizontal upper frame member 15 of the windshield.

On movement of the wiper arm 2 to its other extreme position, the wiper blade is similarly rotated until it again lies substantially parallel to the member 15. During its terminal movements the wiper blade slides relative to the rod 13 whereby the length of the arc swept out by the outer end of the wiper blade is increased.

With this construction it is possible to move the wiper blade through an angle of approximately 180° while the wiper arm itself is driven by the usual suction or electric motor through an angle of approximately 120°. The spring rod 13, in addition to returning the wiper to its normal or intermediate position, exerts a light downward pressure on the inner end of the wiper blade so as to cause such end to bear more firmly on the windshield and lag behind the outer end due to the increased friction.

In the modified arrangement shown in Fig. 3, instead of controlling the rotation of the wiper blade by means of the guiding rod 13, the inner end of the wiper blade is provided with a lug 18. A light tension spring 19 is secured to the lug 18 and anchored at its other end to a bracket 20 secured on the upper frame member 15 at a point below the axis of the wiper arm driving shaft 5, and in alignment with the bridge 8' in its two extreme positions. With such an arrangement, the tension of the spring 19 ensures that the wiper blade will rotate about the anchorage of the spring irrespective of the inclination of the wiper arm 2. In this arrangement the V-slot may with advantage be arranged so that its apex is directed towards the pivot of the arm. The bracket 20 will move with the windshield as it is swingingly adjusted on its hinge 15' (Fig. 2).

In the arrangement shown in Fig. 4, the flanges 9 and 10 of the bracket at the end of the wiper arm 2 are provided on the inner sides with leaf springs 21 and 22, respectively, which bear on the sides of the frame 1 of the wiper blade and tend to retain it resiliently in alignment with the wiper arm 2, but permit rotation thereof about the apex of the sector-shaped slot 11 against the bias of the spring 21 or 22. The wiper blade moves in alignment with the wiper arm 2 during operation of the wiper, until the inner end of the wiper blade approaches the upper frame member 15 when it engages an abutment 23 provided thereon or the frame of the windshield itself. On further outward movement of the wiper arm 2 the wiper blade is rotated about the bridge 8' relative to the arm 2 by the abutment 23, or the windshield frame, against the bias of the spring 21, until in the extreme position of the arm 2 the wiper blade occupies a position substantially parallel to and adjacent the horizontal frame member 15.

During movement of the wiper arm 2 near its other extreme position, the wiper blade is rotated against the bias of the spring 22 in a manner similar to that described above.

Instead of the springs 21 and 22, a small tension spring 24 may be provided which is hooked at one end into a hole 25 at the end of the hooked fin 3, and is anchored at its other end to an abutment 26 provided on the wiper arm 2, as shown in Fig. 5. In such an arrangement the tension of the spring 24 serves to keep the wiper blade resiliently in alignment with the wiper arm 2 until during movement of the latter near its extreme positions, the blade engages abutments such as 23 whereby it is rotated relatively to the wiper arm 2 against the tension of the spring 24.

It will be understood that various further modifications may be made in the construction and arrangement of the wiper without departing from the scope of the invention.

What is claimed is:

1. A cleaner for a motor vehicle windshield, comprising an actuating shaft journaled in the vehicle structure, a wiper, an actuating arm operable by the shaft, means connecting the wiper to the arm for permitting relative angular displacement laterally of the arm to bring the wiper broadside against the windshield framing, and a spring anchored at one end on the arm and having its opposite end slidable in a guideway on the wiper, the spring and guideway being so arranged primarily to resist such displacement and secondarily to urge the wiper more firmly against the windshield.

2. A cleaner for a motor vehicle windshield, comprising an actuating shaft journaled in the vehicle structure, a wiper, an actuating arm operable by the shaft, means connecting the wiper to the arm for permitting relative angular displacement laterally of the arm to bring the wiper broadside against the windshield framing, and a spring anchored at one end to the wiper and at its opposite end to the windshield.

3. A windshield cleaner having a wiper, a pivotally mounted actuating arm, and a single connection between the arm and wiper permitting the latter to rock on its wiping edge to a dragging position at the start of each stroke and also permitting angular displacement of the wiper from a normal operating position beneath the arm whereby the wiper may squarely rest against the windshield frame, and means yieldably holding the wiper against such displacement while permitting the unrestricted rocking of the wiper on its wiping edge to the dragging position and acting to restore the wiper to its normal position upon movement away from the frame.

4. A cleaner for a motor vehicle windshield comprising an actuating arm, means for detachably interlocking the wiper to the arm upon relative angular movement between the wiper and the arm, and resilient means for maintaining the wiper in a normal operating position beneath the arm, said means permitting angular displacement of the wiper from its normal operating position beneath the arm to a broadside position against the windshield framing, said resilient means permitting the interlocking means being manipulated for detaching the wiper from the arm.

5. A windshield cleaner comprising a wiper having an attaching fin between its ends, an actuating arm having an attaching bracket at its free end formed with a V-shaped slot for cooperation with the fin on the wiper for interlocking the wiper to the arm upon relative angular movement between said wiper and arm and permitting angular displacement of the wiper from its normal operating position under the arm, and yieldable means acting to maintain the wiper against such displacement.

6. A windshield cleaner having a wiper, a pivotally mounted actuating arm, means for detachably interlocking the wiper to the arm upon relative angular movement between said wiper and arm, said means permitting angular displacement of the wiper about an axis perpendicular to the windshield, and from a normal operating position under the arm, and a resilient connection between the wiper and arm acting independently of the interlock to yieldably urge the wiper against such displacement and likewise yieldably hold the wiper and arm against relative movement affecting the interlock.

7. A cleaner for a motor vehicle windshield comprising an actuating shaft journaled in the vehicle structure, a wiper, an actuating arm operable by the shaft and overlying the inner end of the wiper, means rockably connecting the wiper between its ends to the arm, said means permitting relative angular displacement of the wiper about an axis perpendicular to the windshield to bring the wiper broadside against the windshield framing, and a spring anchored at one end on the arm beneath the latter and having its opposite end connected to the wiper at a point beneath the arm and spaced from the connecting means.

8. A cleaner for a motor vehicle windshield, comprising an actuating shaft journaled in the vehicle structure, a wiper element, an actuating arm element operable by the shaft, means connecting the wiper element to the arm element and permitting relative angular displacement laterally of the arm element to allow the wiper being brought broadside against the windshield framing, and a spring anchored at one end at a point on one element off-center from the connecting means and having its opposite end slidably mounted on the other element at a point off-center from the connecting means at the same side of the latter as the point of anchorage whereby during such angular displacement the effective leverage of the spring will change accordingly to lessen the spring urge on the wiper when parked.

9. A windshield cleaner comprising an actuating shaft journaled in a fixed part of the windshield framing, a wiper, an actuating arm operable by the shaft, means connecting the wiper to the arm for permitting relative angular displacement laterally of the arm, a coiled spring connected at one end to the wiper, and means on the framing for anchoring the opposite end of the spring, said anchoring means overhanging the windshield whereby when the wiper is parked adjacent the framing the spring will act to hold the adjacent end of the wiper from striking the framing.

WILLIAM E. O'SHEI.